United States Patent [19]
Walker

[11] Patent Number: 5,518,028
[45] Date of Patent: May 21, 1996

[54] ADJUSTABLE MAGNET CARRIER FOR A VALVE POSITION INDICATOR

[75] Inventor: Daniel Walker, Houston, Tex.

[73] Assignee: Keystone International Holdings Corp., Houston, Tex.

[21] Appl. No.: 320,061

[22] Filed: Oct. 7, 1994

Related U.S. Application Data

[63] Continuation-in-part of Ser. No. 270,509, Jul. 5, 1994.

[51] Int. Cl.$^6$ .................................................. F16K 37/00
[52] U.S. Cl. ............................................ 137/554; 137/556
[58] Field of Search .................................... 137/554, 556

[56] References Cited

U.S. PATENT DOCUMENTS

| | | | |
|---|---|---|---|
| 4,721,131 | 1/1988 | Ciordinik et al. | 137/554 |
| 4,926,903 | 5/1990 | Kawai | 137/554 |
| 4,967,792 | 11/1990 | Magee | 137/554 |
| 5,277,223 | 1/1994 | Glockner et al. | 137/554 |
| 5,295,511 | 3/1994 | Schleinhege | 137/554 |

OTHER PUBLICATIONS

StoneL Co. Brochure. Fergus Falls, Minnesota: StoneL Co., c. 1992.

*Primary Examiner*—A. Michael Chambers
*Attorney, Agent, or Firm*—Browning, Bushman, Anderson & Brookhart

[57] ABSTRACT

An adjustable magnet carrier 100 for a rotary valve indicator apparatus 10 is disclosed. The adjustable magnet carrier 100 includes an extension member 117 having an extension member body 118, an extension member body top 119, and an extension body base 121. Upper and lower magnet carriers 144, 146 selectively rotate about extension member 117 to adjust the stand-off between the magnets 102, 104 and the magnetically responsive switches 30, 32. The magnetically responsive switches are hermetically sealed within a separate electronics switch housing 15. Light-emitting diodes 42, 44 radiate from electronics switch housing 15 in response to switches 30, 32. Drive shafts 124, 128 rotate the magnet carriers 144, 146. The outer surfaces of the upper and lower magnet carriers 144, 146, the ends of drive shafts 124, 128, and the light-emitting diodes 42, 44 are color-coded to correspond to each other and to the open and closed positions of rotary valve element 19.

26 Claims, 6 Drawing Sheets

ADJUSTABLE MAGNET CARRIER FOR A VALVE POSITION INDICATOR

This application is a continuation-in-part of U.S. application Ser. No. 08/270,509, filed Jul. 5, 1994.

BACKGROUND OF THE INVENTION

1. Field of the Invention

This invention relates generally to an apparatus for remote monitoring of a rotary valve position. More specifically, this invention relates to an improved construction of a rotary valve position indicator.

2. Description of the Background

Remote monitoring and control of flow systems having numerous valves is often provided by computers using specialized software. An electrical valve position indicator may be used with each monitored valve to provide a signal to the system control computer. Generally, the signal provided by a valve position indicator is indicative of a status condition of the particular valve, such as whether the valve is fully open, fully closed, partially open, and so forth.

Electrical devices that have been used in the past to perform this function have had numerous problems. For instance, the switch indicators available to monitor valves must be sturdy and so are often supplied in large, bulky housings that have numerous crevices, dead-end holes, and other irregularities. Such devices often tend to collect dirt in the cracks and crevices and so are not suitable for operation in food processing environments, such as breweries, that require a high degree of cleanliness.

The electrical switches used in these bulky indicators often have "bounce" problems that may produce false signals in a control system. Furthermore, the switch contacts in such devices are often affected by moisture or other factors so that even if the contacts close properly, they may still have too much contact resistance to allow proper electrical signal flow. This may be especially true for relatively low amperage signals associated with solid state automation control systems. Such problems may cause system operation errors by producing false or intermittently faulty signals.

Even sealed contacts may eventually develop contact resistance problems. Due to the weather-proof or explosion-proof housings of electrical contact boxes, it is difficult and time-consuming for an operator to check whether a fault condition is the result of the contacts being closed but not conducting, or whether the contacts failed to close altogether, or whether the electrical problem lies somewhere in the cabling or interconnections. Once the housing is removed, the contact box is no longer explosion-proof, and activation of a switch during checking or maintenance could ignite flammable or explosive vapors.

As well, electrical connections to the housings are often difficult and time-consuming to complete because they require disassembly of covers or lids from their respective bases. If the cover or lid is not properly reassembled, then leakage eventually occurs that may cause system problems. In some cases, electrical cable conduits go through various ambient temperature conditions that cause them to gradually fill with condensation that eventually makes its way back into otherwise weatherproof switch housings. Weather-proof switches may not be adequately sealed when the switch housings are flushed with fluids or submersed as could happen when a plant is being cleaned.

Furthermore, heavy and bulky valve position indicators, though sturdy, may be easily broken or damaged if dropped, or due to corrosion, or due to leakage in the switch indicator housings. The mounting of the switch indicator devices to the valve actuator assemblies is often cumbersome and difficult because it requires threading and tightening of numerous small screws or nuts. The metallic construction of many switches eventually results in corrosion that causes the switch installation to physically seize up, weaken or come loose, leak, or otherwise operate in an undesirable manner.

Heavy valve switch boxes are expensive and require considerable ongoing maintenance. Because the switch indicators are large, bulky, and clumsy, they are difficult to manufacture and have tended in the past to spawn many different nonstandardized brands that may have to be used in a single system. Switch packages are typically cumbersome in that two separate packages must be used to provide an open position switch and a closed position switch.

The power supplied to some valve position indicators, especially those that use inductive or capacitive proximity detectors, requires precise voltage specifications and cannot be used without modification for both alternating and direct current power. Power fluctuations may cause false signals to be produced in such valve position indicators to thereby deleteriously affect the computer control system.

As well, valve position indicators are typically sensitive to load variations. For instance, a valve position indicator designed for use with an inductive load may cause system problems when used with a solid state load. A solid state valve position indicator that is required to even momentarily switch a load outside its tolerances will often fail.

Another problem with prior art position indicators concerns mechanical adjustment provisions for selecting a desired rotary angle of the valve at which a switch provides an open or close signal. In some systems, the rotary angle at which a switch opens or closes is not critical, so long as it is consistent, because the angle(s) may be entered into a control program that accounts for this factor. In other systems, it is necessary to mechanically adjust switch activation to occur at the desired degree of rotation of the valve. Adjustment means of prior art devices typically have problems relating to (1) mechanical wear that causes gradual changes in switch position activation, (2) gearing or splining problems that allow only relatively course adjustments, (3) exposed switches during adjustments that could ignite flammable gases, (4) poorly marked adjustment assemblies that lend themselves to adjustment errors, and (5) problems related to prior art position indicator device shortcomings discussed hereinbefore.

Consequently, there remains the need for an improved rotary valve indicator that offers dependable operation at reduced levels of capital investment, is compact, is easily cleaned, handles small power signals without contact bounce problems, operates reliably even with wide power fluctuations and different types of loads, provides hermetically sealed switch contacts, is rugged and reliable, is submersible and explosion-proof, is easily mounted, requires little maintenance, is easily and safely adjustable, and is of such low cost that it can be thrown away if failure occurs. Those skilled in the art have long sought and will appreciate the present invention, which provides solutions to these and other problems.

SUMMARY OF THE INVENTION

Therefore, an object of the present invention is to provide an improved rotary valve position indicator.

Another object is to provide an adjustment mechanism that may be adjusted without exposing electrical contacts that could ignite explosive or flammable gases.

Yet another object of the present invention is to provide a color-coded adjustment mechanism designed to allow for quickly and easily setting, with high accuracy, the rotary angle at which contacts provide a signal.

A feature of the present invention is an adjustable rotating magnet carrier that is separate from an electronics switch housing having a pair of magnetically activated switches therein.

An advantage of the present invention is reduced maintenance because wear does not affect switch opening and closing positions.

Another advantage of the present invention is an infinitely adjustable and accurate magnet positioning apparatus.

The present invention provides for an indicator assembly to indicate a valve position of a rotary valve element. The rotary valve element is rotatable by an actuator assembly that is typically disposed in an actuator assembly housing. The actuator assembly includes a rotational element that rotates along with the rotary valve element to open and close the valve. The indicator assembly includes an extension member rotatably secured to the rotational element for rotation therewith. A first magnet support is carried by the extension member and supports a first magnet. The first magnet support is operative for selective positioning of the first magnet with respect to the extension member. A securing means is provided for selectively affixing the first magnet with respect to the extension member. An electronics switch housing is mounted to the actuator housing independently from the extension member and the rotational element. The electronic switch housing is mounted at a selected distance from the extension member. The switch assembly includes a first reed switch internal to the switch housing and responsive to rotation of the first magnet for indicating a first position of the rotary valve element.

In a preferred embodiment, the electronic switch housing is substantially filled with an electrically non-conductive material. The first switch and a second switch are preferably both disposed internally of the substantially filled electronic switch housing to provide first and second indications of respective first and second rotary valve positions.

The first magnet support preferably has a first color-coded outer surface. A second magnet support preferably has a second color-coded outer surface.

The extension member preferably includes first and second apertures therein each having respective axes that are parallel to the axis of the extension member. First and second drive members are operable for rotating the first and second magnet supports and are rotatable within the first and second apertures for that purpose.

Other features and intended advantages of the present invention will be more readily apparent by reference to the following detailed description in connection with the accompanying drawings.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

The present invention provides generally for an improved rotary valve position indicator and method. The rotary position indicator of the present invention is preferably characterized by its separation of magnet carrier and electric switch circuitry. This construction produces two housings, rather than one housing with a rotatable portion built into the housing as is seen in prior art rotary position indicators. The result is an indicator assembly with two smaller and more convenient overall size housings, sturdier construction, and uncomplicated operation. Those skilled in the art will come to appreciate that the present invention is a great improvement over prior art rotary valve position indicators. The preferred separate mounting of a rotary magnet carrier apart from the electronics control box effectively eliminates those problems associated with rotating components within a single housing. In fact, the relatively simple improvement of placing the magnets and switches in separately mounted housings produces numerous surprising advantages, as discussed hereinafter, that provide solutions to many problems that have plagued prior art valve position indicators.

Figure 1:
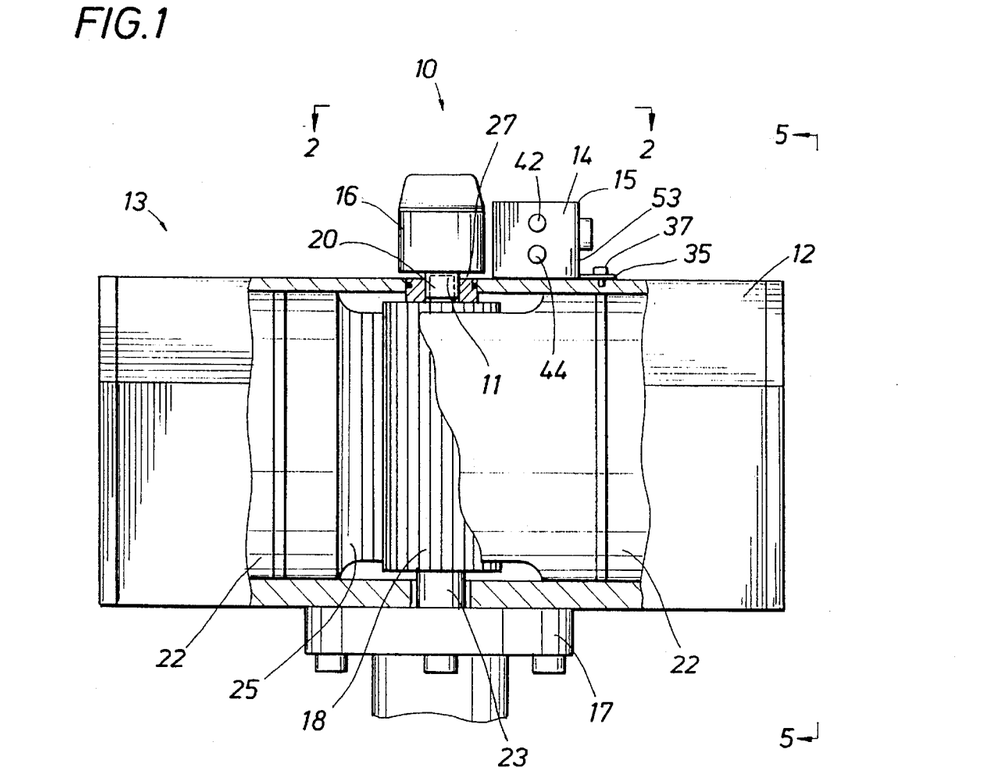
FIG. 1 is an elevational view, partially in section, of a rotary valve indicator mounted to a valve actuator in accord with the present invention.

With reference now to the drawings, and more specifically to FIG. 1, there is shown a position indicator assembly 10, mounted to valve actuator housing 12 of actuator 13. Position indicator assembly 10 includes electronic switch 14 and magnet carrier 16.

Figure 2:
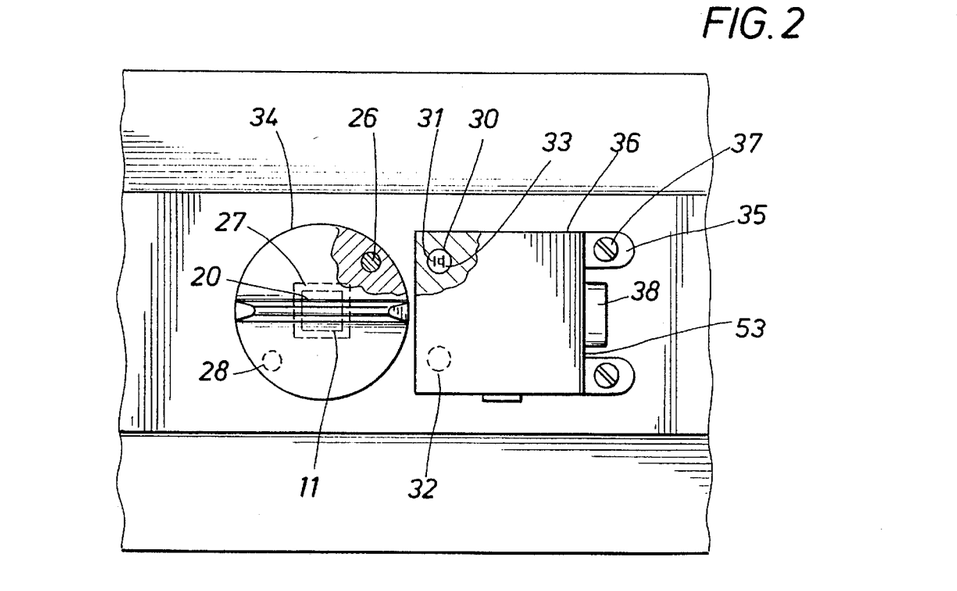
FIG. 2 is an upper view, partially in section, of the rotary valve indicator of FIG. 1 along the line 2—2.
Figure 5:
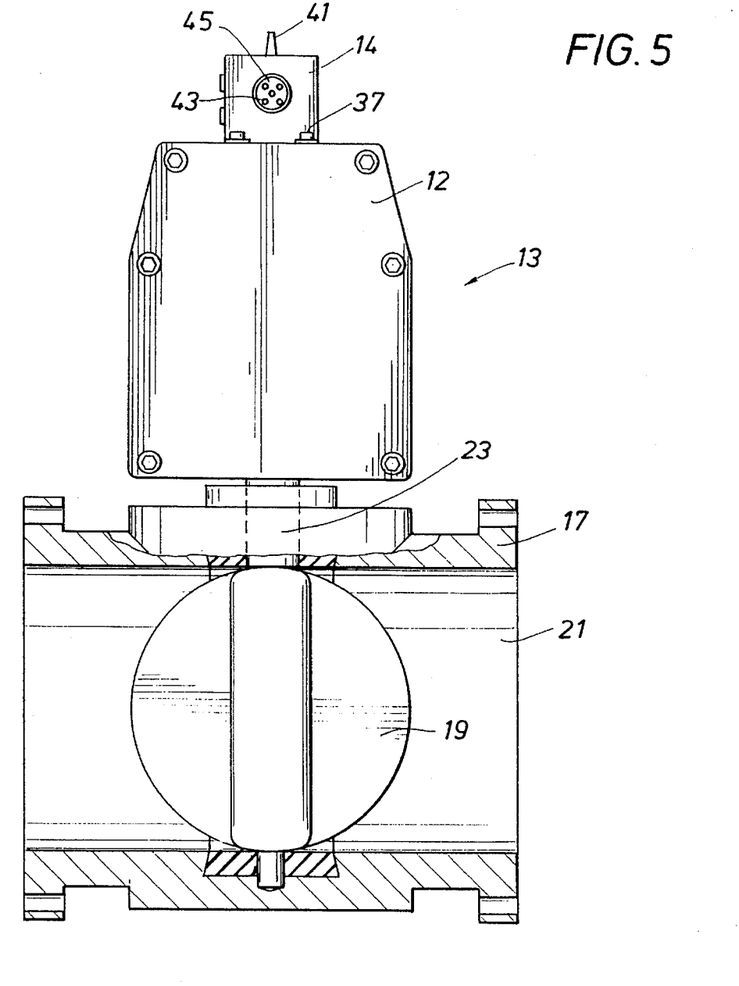
FIG. 5 is an elevational view, partially in section, of the rotary valve indicator of FIG. 1 along the line 5—5.

Valve actuator housing 12 is mounted to rotary valve 17 (see FIG. 5). Rotary valve 17 includes rotary valve element 19 that rotatably moves between an open and a closed position to control fluid flow through bore 21. Rotary actuator 13 may be electrically, pneumatically, manually, or otherwise powered, for rotary movement of rotary valve element 19. In FIGS. 1, 2, and 5, rotary actuator 13 is of the pneumatic type, with pneumatic pistons 22 having racks 25 secured thereto for engaging and rotating pinion 18 to open and close rotary valve 17. Actuator shaft 20 is rotatable and is preferably connected, directly or indirectly, to rotary valve shaft 23 that rotates rotary valve element 19. Magnet carrier 16 is mounted on actuator shaft 20 of rotary actuator 13 and rotates therewith. Therefore, magnet carder 16 also rotates in concert with rotary valve shaft 23 and corresponding rotary valve element 19.

Magnet carrier 16 preferably contains two magnets 26 and 28, each producing a magnetic field, that are used to indicate the open and closed positions of valve 17. Magnets 26 and 28 may be arranged in various configurations, as desired, to activate reed switches 30 and 32, which are correspondingly arranged to most suitably receive the respective magnetic fields of the magnets. While magnets 26 and 28 are preferably mounted within substantially cylindrical magnet carder 16, they could also be on arms (not shown), in a disc (not shown) that could rotate above switch housing 15, or in numerous other configurations as desired.

The relative position of the magnets 26 and 28 with respect to reed switches 30 and 32, and more particularly switch contact elements 31 and 33, shown with respect to reed switch 30, determine the degree of rotation of valve element 19 at which reed switches 30 and 32 open and close. Because the switches of the present invention are magnetic and have no wear, the particular point of opening and closing during rotation of valve element 19 does not change due to electrical variations or mechanical wear that occurs in other switches. The operating repeatability of opening and closing of the switches, with respect to position of the valve, stays within about plus or minus one-half degree. A presently preferred adjustment mechanism, shown in FIG. 9–FIG. 10 and discussed hereinafter, may be used herewith to adjust the particular valve angle(s) at which the opening and closing of the switches occurs.

The magnets 26 and 28 are preferably of the rare earth type so as to provide relatively constant magnetic field strength over a long period of time, although other types of suitably long-lasting magnetic material could also be used. With long-lasting magnets, the reed switches are reliably operated in a stable manner over a long period of time, so that there is no significant signal timing variation due, for instance, to aging of the magnet. Magnets 26 and 28 may be encapsulated, if desired, to reduce the possibility of any corrosion that could affect magnet strength. In a presently preferred embodiment, magnet housing 16 has a substantially square or rectangular socket (or plug) mounting 27 (see especially FIG. 2) that secures its position with respect to the preferably square or rectangular end portion 11 of actuator shaft 20.

Switch housing 15 may be mounted to actuator housing 12 with brackets 35 and screws 37 at threaded mounting holes 39. Alternatively, switch housing 15 may be mounted on stand-offs 40 with threaded bolts 46 (see FIGS. 3, 4, and 6). Bolts 46 may extend through electronics switch 14 or may be accessible through an aperture through the housing. Blank stand-offs 63 do not have a bolt therethrough but are preferably molded onto switch housing 15 for additional support. The mounting stand-offs 40 preferably have weep slots 61 therein. Weep slots 61 allow any liquid that may enter at the head of securing bolts 46 to flow out or evaporate rather than become trapped so as to produce mold or bacteria. This latter mounting method may be preferred for valve operation in sterile environments where surfaces are preferably exposed to the ambience so that they can be more easily cleaned. A sterile environment in which such a mounting may be desired could, for instance, include a brewery with an automated valve system.

As discussed briefly hereinbefore, Applicant preferably mounts the magnets separately from the reed switches in a separate magnet carder 16 and electronics switch 14 because such a configuration results in surprisingly numerous benefits. This separate construction results in less complex, smaller, more compact, sturdier, and more easily mounted components. This simple construction avoids the problem of cracks and crevices that can collect debris, as is undesirable in a sterile environment, because the separate electronics switch box 15 and magnet carrier 16 are easily formed with smooth walls, such as smooth walls 34 and 36 on the switch box and magnet housing, respectively. While magnet carrier 16 and switch box housing 15 have the shape herein disclosed, they could have other shapes as desired.

Mounting wall 47 may for some purposes be preferably raised by stand-offs 40 and 63 so as to allow easy, unobstructed cleaning when necessary for a sterile environment. A smoothly raised elongate portion 41 on magnet housing 16 may be used to visually indicate whether valve 17 is open or closed. Preferably switch box 15 is box-like and has six sides 47, 49, 51, 53, 55, and 57. The mounting is preferably made using just one side of switch box 15 to prevent the formation of unnecessary cracks and crevices during the mounting. As shown, lower side 47 is used in FIG. 3 and an outer side 53 is mounted with brackets 35 in FIG. 2. Thus, the remaining sides are connected to actuator housing 12 only by virtue of their connection to switch box 15 and not due to other external connecting members that form additional cracks and crevices.

Switch housing 15 and magnet carrier 16 are clearly not held together by a larger housing or interconnected structure as used in the prior art, but are separately and independently mounted and supported by actuator 13. The magnet-reed switch spacing between switch housing 15 and magnet carrier 16 is normally fixed at the desired optimal spacing by the positioning of threaded mounting holes 39 in outer surface 59 of actuator housing 12 (see FIG. 4). Thus, no adjustments are normally required. However, the mounting bracket 35, stand-offs 40, or mounting holes 39, or mounting method could be reconstructed or designed for a different magnet-reed switch spacing.

Because electronics switch 14 is small and effectively includes no moving parts, switch box 15 is easily sealed if desired, as by filling with epoxies or other nonconducting materials. Therefore, electronic switch box 14 is preferably filled with a sealing material 29, such as epoxy, elastomeric material, or the like (see FIG. 4). Although reed switches 30 and 32 contain movable contact elements 31 and 33, the contact elements are hermetically sealed so that the switches are conveniently epoxied in place if desired.

To maintain switch tolerances, it is desirable that the magnets and switches be securely mounted, within the respective switch housing 15 and magnet carrier 16, in a manner that will not change due to vibration or even severe shocks such as if switch housing 15 or magnet carrier 16 is dropped during, for instance, transport or assembly. Because housings 15 and 16 are preferably filled with epoxy or other such material, secure mounting of the switches and magnets is not a problem in the present invention. This sturdy mounting provides a great advantage over prior art assemblies that normally cannot be dropped or otherwise experience significant g-shock and/or extensive vibration without damage or calibration variations.

To further enhance electronics switch 14 sealing, it is possible to include a preferred embodiment connector socket 38 therewith, which may conveniently include five pins 43 (see FIGS. 2, 3, 5, and 6) and have a sealed socket interior portion 45, to prevent condensation from reaching the interior of switch box 15. If switch box 15 is filled with epoxy sealing, such condensation would not reach any operating components even without a sealed socket interior portion 45. Connector socket 38 may also be of the type that is used with a flange-type plug (not shown), such as a connector assembly available from Brad Harrison or other connector manufacturers, that quickly and securely provides a good electrical connection. Other connections may also be used. For instance, a conduit (not shown) may be installed directly to connector 38 without a sealed interior portion 45 but having several feet of leads extending therefrom to be threaded through the conduit. The sealed switch housing 15 remains watertight. As well, because switch housing 15, including switches, light-emitting diodes (L.E.D.s), and circuitry, is completely filled with epoxy, the present invention is effectively explosion-proof so as to be useable in areas which become filled with explosive or highly flammable vapors.

Open indicator 42 and closed indicator 44 provide a visual indication of whether a respective reed switch 30 or 32 is activated. For instance, with reference to FIG. 7, which shows a simplified schematic diagram of the circuit of switch 14 within switch housing 15, open indicator 42 will light when corresponding reed switch 30 is magnetically activated to make contact by a corresponding magnet. Open and closed indicators 42 and 44 are preferably L.E.D.s.

Figure 7:
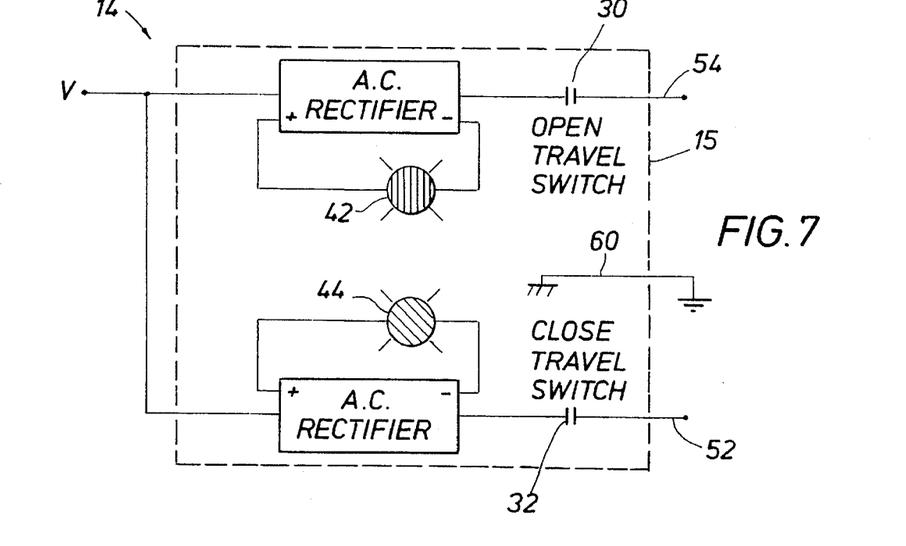
FIG. 7 is a schematic for an electronic switch in accord with the present invention.

In operation of the electronic circuit of switch 14 shown in FIG. 7, voltage from a power source or signal source V is applied to reed contacts of reed switches 30 and 32. When rotary valve element 19 is in a closed position, contacts of reed switch 32 will close to connect light 44 to control devices (not shown) and activate light 44. Voltage V is also applied to output line 52 to indicate that valve 17 is closed. Reed switch 30 is open so that light 42 is off and output line 54 is deenergized. As rotary valve element 19 moves from the closed position to the open position, both lights and output lines will be disconnected from voltage V, and the computer system will sense that the valve is moving. When rotary valve 19 moves to the open position, light 42 is on and output line 54 is connected to voltage V.

Reed switches 30 and 32 have small contact mass and therefore are not likely to produce contact "bounce" that could disrupt output signals to a system that may be connected to output lines 52 and 54. Furthermore, hermetically sealed reed switches 30 and 32 are less likely than large contacts to develop contact resistance due, for instance, to corrosion. Contact resistance sometimes prevents otherwise closed switches from conducting relatively small analog and control signals that are typically between about 4 to 20 milliamperes. Such signals are typically greater than about 2 milliamperes. A preferred embodiment switch may be designed for about 25 VA. Thus, with a 24 volt AC or DC power, it may provide up to about 1 ampere of current. With 120 volts, it may provide up to about 0.2 amperes of current. The use of reed switches in the present invention, rather than electronic switches, allows considerably wide signal tolerances. Reed switches can often take temporary overloads whereas electronic switches normally fall immediately with an overload.

Another advantage of the circuit and configuration of the present invention is that the L.E.D.s are connected in a manner that not only determines the status of the valve but also indicate that the relevant switch is closed and actually does conduct the small signal levels that are also used to activate the L.E.D.s. Thus, a technician can readily determine, without having to open a sealed enclosure and perform current checks, whether the switch is functioning correctly—a job that is difficult and time-consuming. Small analog and control signals are typically about 4 milliamperes and normally not larger than about 200 milliamperes, although reed switches may have a significantly greater current-carrying ability.

Figure 8:
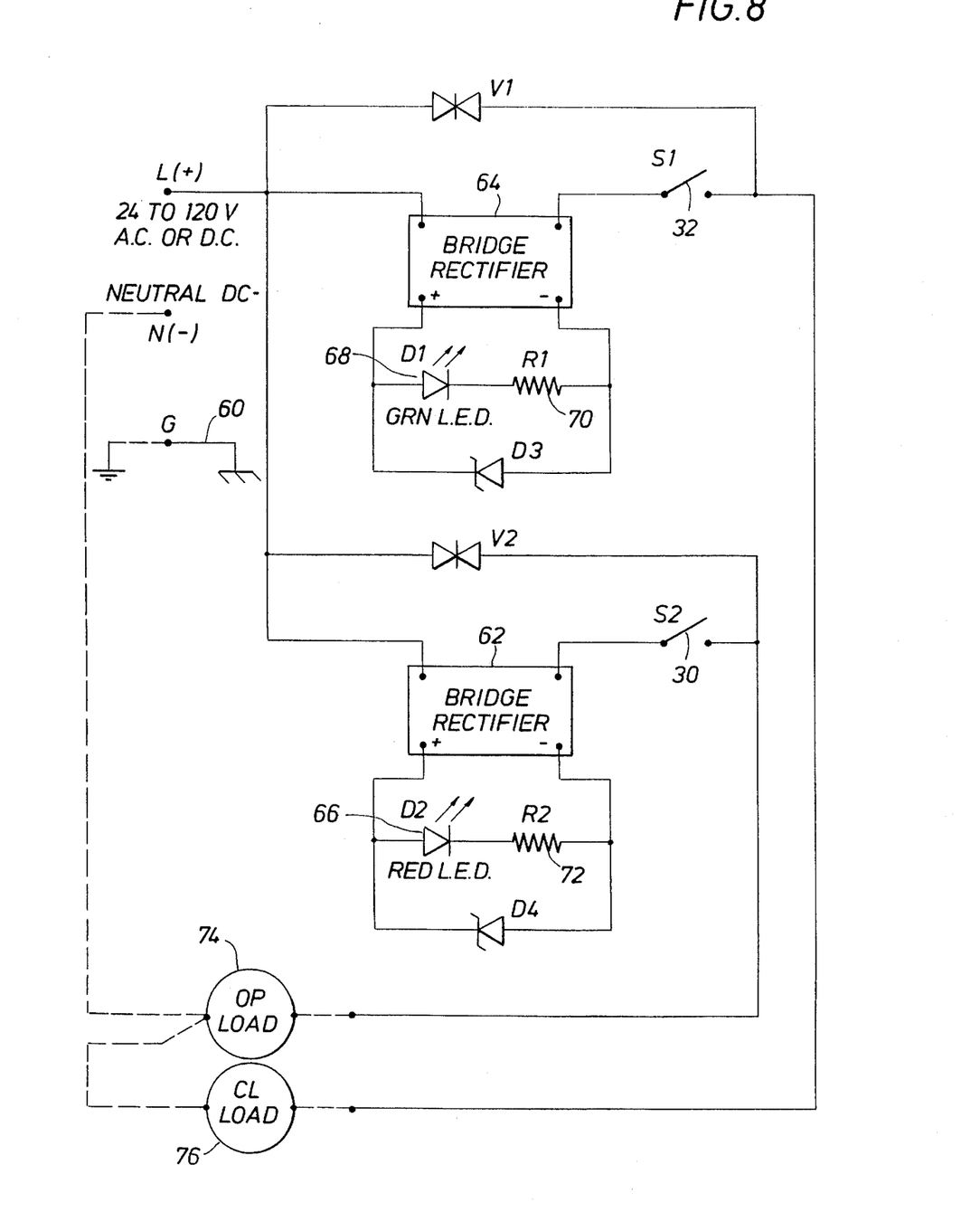
FIG. 8 is an alternative embodiment schematic for an electronic switch in accord with the present invention.

Another presently preferred circuit embodiment for electronic switch 14 is shown in FIG. 8. Voltage L(+), which is typically a system voltage, may be either direct current or alternating current and will typically range from 24 to 120 volts A.C. or D.C. As well, the circuit of FIG. 8 will work for wide tolerances in voltage L(+). Thus, the circuit of FIG. 8 has significant advantages over many proximity detector circuits that require a fairly close tolerance voltage L(+). Typical values for operating voltage L(+) of the present embodiment may be 24 volts up to 120 volts AC or DC, with a wide tolerance for these voltages. The wide range of possible supply voltages do not adversely affect operation of either the switches or the L.E.D.s. L(+) is applied with respect to N(−), which may be a circuit ground, common, system ground value, or chassis ground, or could be a negative voltage, and so forth. Ground may also be applied by ground line 60. The dashed lines shown in FIG. 8 generally represent field wiring external to switch housing 14.

Bridge rectifiers 62 and 64 provide that either alternating current or direct current will activate respective L.E.D.s 66 and 68. Zener diodes D3 and D4 are parallel with respective L.E.D.s to ensure a constant voltage even with quite wide variations in power. Varistors V1 and V2 protect switches 30 and 32, as well as respective bridge rectifiers 62 and 64, from damaging back emf's that occur as the switches open to thereby interrupt supply to an inductive load such as a relay coil and the like. Resistors 70 and 72 limit current to respective L.E.D.s to prevent damage and promote long life. Switches 30 and 32 function to indicate that rotary element 19 is, respectively, open or closed. Output lines provide the status information, as determined by the position of switches 30 and 32, to the open and closed loads 74 and 76, respectively, applied by the control system.

In operation, a respective normally open reed switch will close at the end of valve actuator 13 travel to allow current to flow. This output is used by the customer to energize a load—i.e., relay coil, solenoid, P.L.C. input, and the like. The L.E.D. can only be illuminated if (1) the respective reed switch is closed and (2) the respective reed switch is also conducting electricity. Thus, illumination of the L.E.D. provides proof to service personnel that the switch is operational. As well, red L.E.D. 66 is typically used to visually indicate an open valve and green L.E.D. 68 indicates a closed valve.

The circuit of the present invention will operate on 6 to 120 volts A.C. or D.C. and even has wide operating tolerances with that range of operation voltage. If the A.C. line or D.C. positive supply is connected to terminal point of L(+), then current will flow through the full wave bridge rectifier, assuming the respective normally open reed switch is closed. If a respective reed switch is not closed, then the respective output 74 or 76 will not be driven and the respective L.E.D. cannot be illuminated. The respective load will also see a very high impedance when the switch is open because the impedance of the varistors, V1 and V2, is normally very high, as discussed hereinafter.

If valve actuator 13 is run fully open or closed, then a respective of magnets 26 and 28 in magnet carrier 16 will be rotated into the appropriate reed switch magnetic activation field. The selected switch will close its contact and drive the customer's load device, and the respective rectifier will therefore have current flowing through it and will produce a D.C. voltage supply on its ± terminals. The respective Zener diode will shunt off voltage and hold a steady value across the L.E.D. branch circuit. A respective of resistors 70 and 72 is placed in series with each L.E.D. to limit the current flow through the L.E.D. within its design parameters.

Varistors V1 and V2 are located in the circuit across the respective bridge rectifiers and reed switch contacts. The varistors have no effect on the circuit (very high impedance) provided that the voltage potential does not exceed the respective varistor rating. However, if a voltage spike appears in the line, or the switch opens to de-energize an inductive load-i.e., a relay coil--then the resultant back emf's damaging effect on the contact and bridge rectifier will be minimized. The varistor's ability to clip off dangerous power spikes also minimizes the magnitude of any arcing that occurs when switch contacts break an energized circuit, thus prolonging contact life. In this manner, the varistors provide over-voltage and back emf protection to the switches.

In summary, the present circuitry is usable with a wide range of supply voltages and types of loads, includes a self-test L.E.D. that eliminates questions of switch operation to reduce service time, and is sealed in a rugged, waterproof, explosion-proof package.

Figure 6:
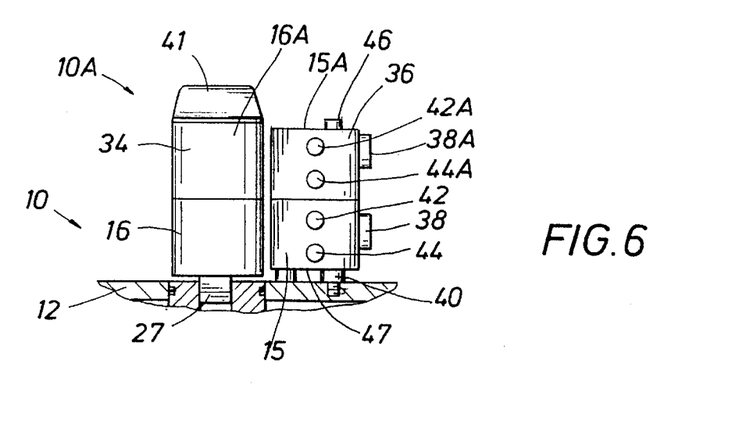
FIG. 6 is an elevational view, partially in section, of stacked switch housings and magnet carriers.

With reference now to FIG. 6, yet another feature of the present invention is shown that allows for multiple circuits operating at different voltages. For instance, an emergency shutdown circuit may be connected to switch indicator 10A, and the computer control system could be connected to switch indicator 10. Each system could operate at separate voltages. However, closed and open signals at those separate voltages would be available by the stacked switch boxes 15 and 15A operated by respective stacked magnet carriers 16 and 16A. Other respective features discussed earlier are referred to with an "A" suffix. The size and shape of the housings of the present invention are very suitable for such stacking, which may be used to provide two or more circuits attached to a single actuator housing 12.

Figure 9:
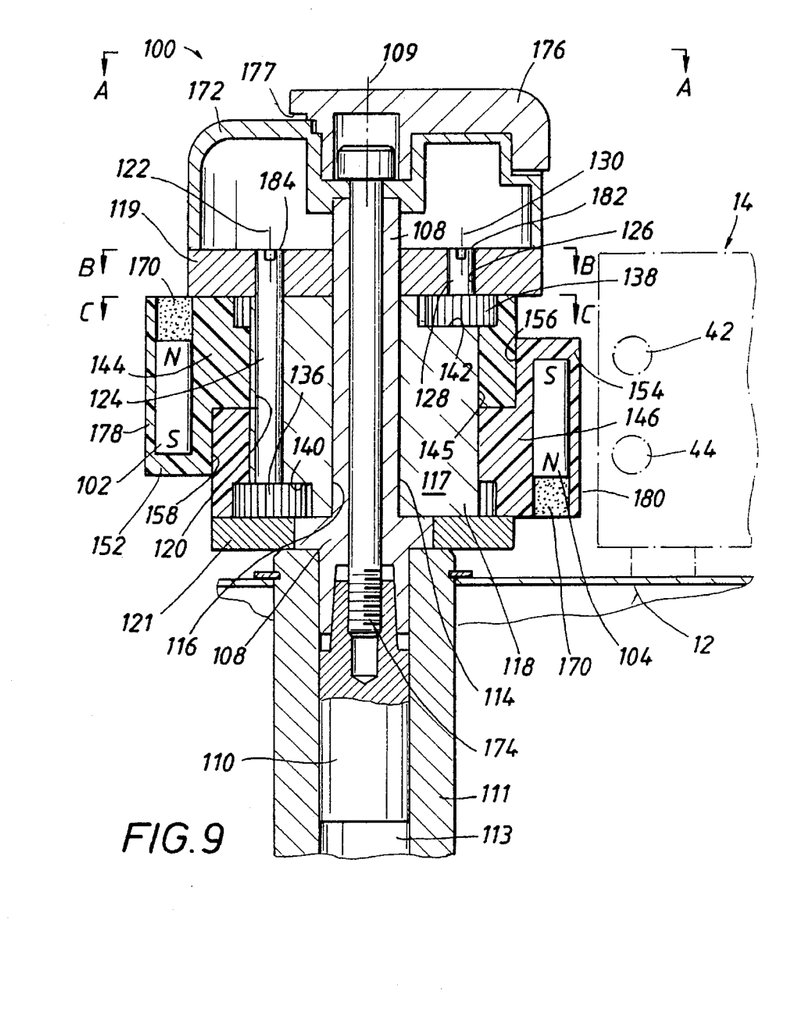
FIG. 9 is an elevational view, partially in section, of a magnet carrier with adjustably positioned magnets.
Figure 10:
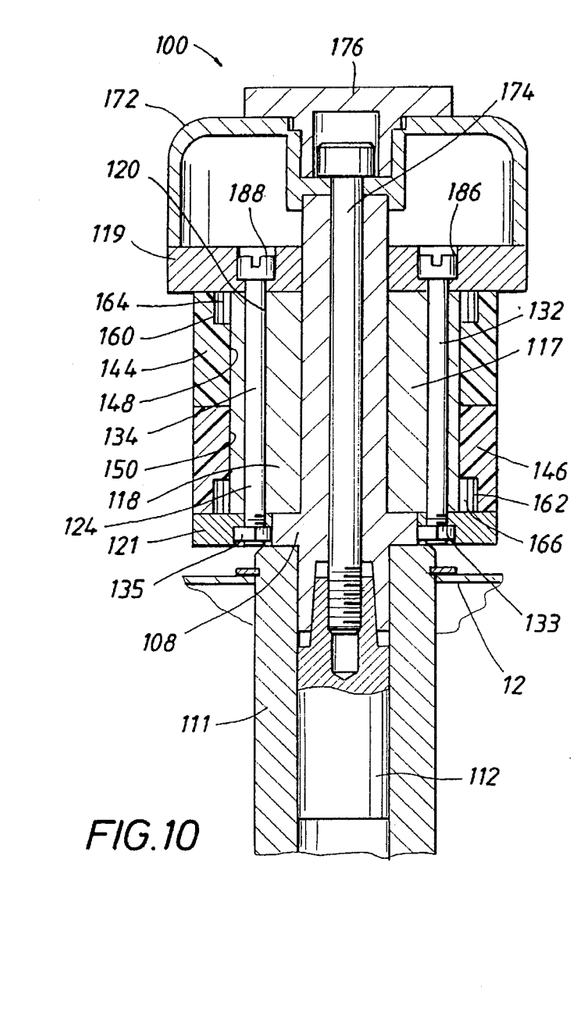
FIG. 10 is an elevational view, partially in section, of the magnet carrier of FIG. 9 rotated 90°.

An additional adjustable magnet carrier feature of the present invention is illustrated in FIG. 9–FIG. 10. In some systems, it is not necessary that a signal occur at a specific angle or position of rotary element 19, such as, for instance, 5° before fully open. So long as the angle at which the signal occurs is known, a computerized control system can compensate accordingly once that angle is provided or determined. However, for other systems it is required that the open and closed signals be given at particular desired moments corresponding to specific angles of rotation of rotary element 19 and therefore requires an adjustment of the indicator for this purpose.

Figure 3:
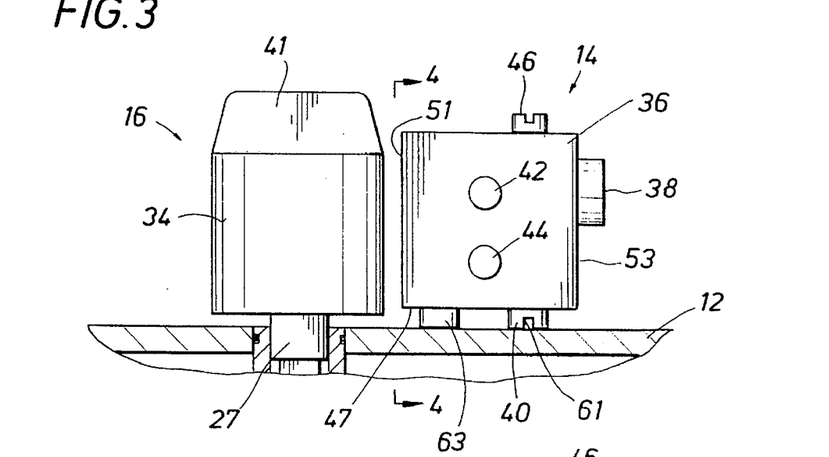
FIG. 3 is an elevational view, partially in section, of an alternative embodiment rotary valve indicator.
Figure 4:
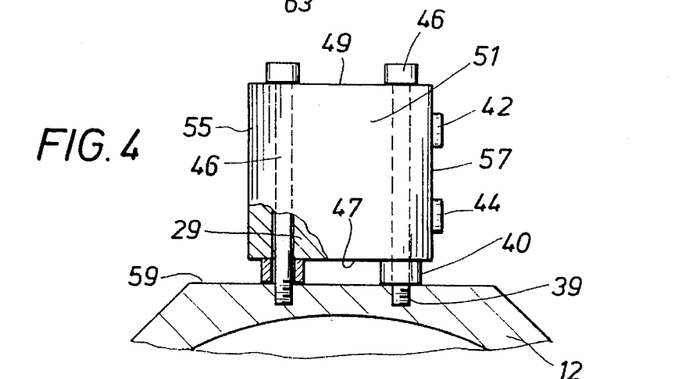
FIG. 4 is an elevational view, partially in section, of the switch housing of FIG. 3 along the line 4—4.
Figure 9A:
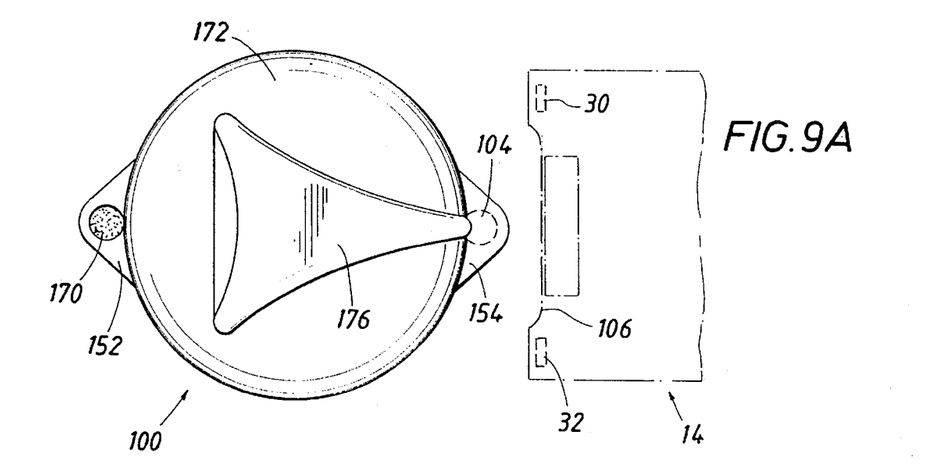
FIG. 9A is a top view of the magnet carrier of FIG. 9 along lines A—A.

An adjustable magnet carrier 100 is provided that allows for adjustment of the position of open and close magnets 102 and 104, respectively. It will be apparent that adjustable housing 100 may be used with the same switch housing 14 as discussed hereinbefore so that no extra costs are incurred for a special switch housing. However, in a presently preferred embodiment, switch housing 14 may also have a somewhat U-shaped surface 106 that may be facing carrier 100 or magnet carrier 16, as indicated in FIG. 9A, rather than a substantially flat surface 51, as indicated in FIG. 3. Other shapes or configurations of switch housing 14 may also be used as desired that will conveniently allow operation of the magnetically sensitive reed switches with corresponding control magnets.

Magnet carrier 100 may be securely adapted to actuator housing 12 by various means as will be understood by those skilled in the art. However, a presently preferred embodiment of magnet carrier 100 includes for this purpose extension shaft 108 that extends outwardly from actuator housing 12. Extension shaft 108 includes an adaptor or clamping portion 110 to adapt to actuator shaft 111. Alternatively or in combination, an appropriately cross-sectioned actuator shaft adaptor may be used to connect between extension shaft 108 and actuator shaft end connector 113. Extension shaft 108 is thereby affixed to actuator shaft end connector 113 for rotation with actuator shaft 111 and with rotary valve element 19.

Outer surface 114 (see also FIG. 9B–9C) of extension shaft 108, which may be partially cylindrical, square, or otherwise contoured, is received within aperture 116 through extension member 117. The components of extension member 117 include extension body 118, extension body top 119, and extension body base 121. These components of extension member 117 are preferably commonly secured together into a single unit by means such as retainer bolts 132 and 134 as shown in FIG. 10. Retainer bolts 132 and 134 clamp the components of extension member 117 together as bolts 132 and 134 are rotated to threadably engage clamping screw nuts 133 and 135, respectively.

Extension member 117 includes therein long shaft aperture 120 having long shaft axis 122. Long shaft 124 is accordingly rotatable within long shaft aperture 120. Extension member 117 also includes therein short shaft aperture 126 having short shaft axis 130. Short shaft 128 is rotatable within short shaft aperture 126. Long shaft axis 122 and short shaft axis 130 are preferably parallel to extension shaft axis 109. Lower gear 136 and upper gear 138 are secured to long shaft 124 and short shaft 128, respectively, and are rotatable within respective gear slots 140 and 142. It should be noted that where terms such as "upper," "lower," and the like are used herein, they are meant to provide for easier understanding of the invention with respect to the drawings and are not intended to limit the invention in any manner.

Open or upper magnet carrier 144 is positioned in surrounding relationship to extension body 118 and is rotatable around outer cylindrical surface 145 of extension body 118. Similarly, close or lower magnet carrier 146 is slidably rotatable along outer cylindrical surface 145 of extension body 118. For this purpose, open magnet carrier and close magnet carrier 144, 146 include through apertures 148 and 150, respectively, to receive cylindrical surface 145 of extension body 118. Open magnet carrier 144 and close magnet carder 146 are axially spaced with respect to each other along axis 106 of extension shaft 108. Preferably, the magnet carriers are formed of a plastic, elastomeric, or other non-metallic or non-magnetic material.

Open and close magnet carriers 144 and 146 include open and close magnet lobes 152 and 154, respectively. Lobes 152 and 154 have an outer contour perhaps best shown in FIG. 9A–9C. Lobes 152 and 154 protrude outwardly from the respective magnet carriers and are generally cam-shaped with a rounded-top triangular shape. Other shaped protruding or projecting components could be used instead of lobes 152 and 154 as shown. Lobes 152 and 154 provide a conveniently shaped extension member, not easily broken off, that allows for a somewhat longer magnet to be used because the magnets are positioned laterally outwardly from the generally cylindrically shaped magnet housing 100. Lobes 152 and 154 also include respective interlocking surfaces 156 and 158 that interlock with, and engage the surface of, the adjacent magnet carrier to physically reinforce the lobe structure.

Encapsulated within lobes 152 and 154 are respective cylindrical magnets 102 and 104. Epoxy material 170 or other suitable sealing material is preferably utilized to secure the magnets within their position. The magnets are preferably inverted with respect to their magnetic polarity so as to minimize interaction of their respective flux lines.

Along inner arcuate surfaces 160 and 162 of open magnet carrier 144 and 146, respectively, open magnet carrier gear teeth 164 and 166 are provided. As best shown in FIG. 9C, upper gear 138 with upper gear teeth 139 is used to engage open magnet carrier gear teeth 164 for rotating open magnet carder 144 as described hereinafter.

Cap 172 mounts to extension member 117 by means of cap retainer bolt 174. Cap retainer bolt 174 also provides that magnet housing 100 is solidly secured to actuator housing 12. Indicator arrow 176 is snap-mounted to cap 172 and may be easily snapped on and off as desired. For instance, a screwdriver (not shown) may be inserted in slot 177 to snap off indicator arrow 176 when necessary to provide adjustments for positioning magnets 102 and 104 with respect to reed switches. Indicator arrow 176 is preferably colored brightly such as with a bright, possibly luminescent, yellow color that contrasts against a black or otherwise dark color background of cap 172. Thus, indicator arrow 176, which may also be used with magnet housing 16, is readily visible even in a shadowed area.

For ease of operation, color-coded surfaces are used with magnet housing 100. Although other colors could be used, the color red is preferably associated with a "valve open" condition. The color green is preferably associated with a "valve closed" condition. This is consistent with the red-colored L.E.D. 66 that indicates the valve is open and the green-colored L.E.D. 68 used to indicate that the valve is closed. In accordance with this color-coding scheme, open magnet carrier 144 has a red outer surface 178. Close magnet carrier 146 has a green outer surface 180. Short drive shaft slotted end 182, where adjustment is made, is preferably red. Long drive shaft slotted end 184 is preferably green. These surfaces could also be marked with an "OPEN" or a "CLOSE" preferably highly visible indicia.

With color coding as discussed hereinbefore, the adjustments necessary for operation of magnet housing 100 are substantially intuitive to those skilled in the art. In the presently preferred embodiment, a screwdriver (not shown) may be used to perform the necessary adjustments. Thus, the screwdriver is inserted into slot 177 to snap off yellow indicator arrow 176. Cap retainer bolt 174 is unscrewed from threads 177 and removed to allow subsequent removal of cap 172.

Figure 9B:
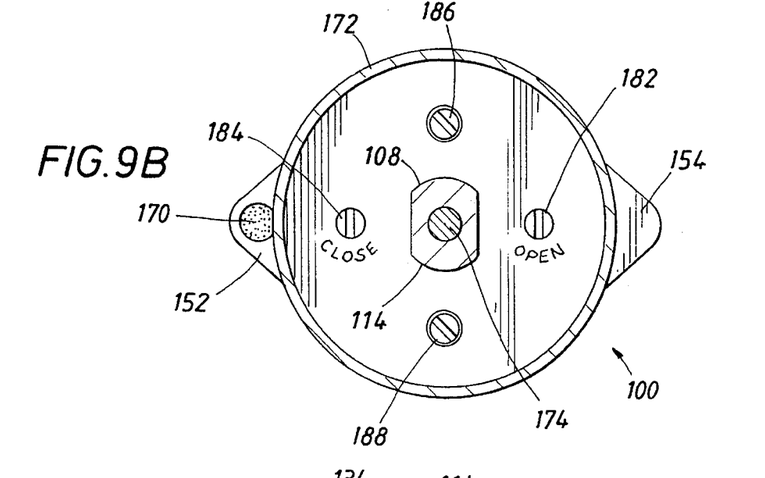
FIG. 9B is a cross-sectional view of the magnet carrier of FIG. 9 along lines B—B.
Figure 9C:
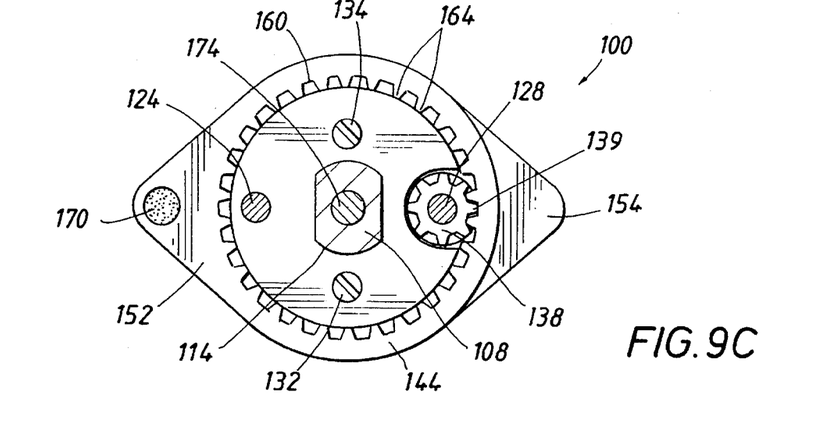
FIG. 9C is a cross-sectional view of the magnet carder of FIG. 9 along lines C—C.

After removal of cap 172, the drive shaft slotted ends are visible as shown in FIG. 9B. Also visible are slotted screw heads 186 and 188 of retainer bolts 132 and 134, respectively. The screwdriver is inserted into screw heads 186 and 188 and rotated so as to loosen, but preferably not remove, bolts 132 and 134. This loosens up extension body top 119 and extension body base 121 with respect to extension body 118, to thereby allow rotation of open and close magnet carriers 144 and 146 via short and long drive shafts 124 and 128.

The screwdriver may then be inserted into red end slot 182 and rotated to thereby rotate open magnet carrier 144 and also rotate corresponding red outer surface 178. Rotation of short drive shaft 128 with the screwdriver inserted in red end slot 182 accordingly rotates upper gear 138 that engages gear teeth 164 to rotate open magnet carrier 144 and open magnet 102. Short drive shaft 128 rotates in the same direction as open magnet carrier 144 rotates. Likewise, long drive shaft 124 rotates in the same direction as close magnet carrier 146. A single rotation of short drive shaft 128 is preferably designed to correspond to a specific number of degrees of movement of rotary valve element 19. For instance, a single rotation may correspond to a single degree of movement of rotary valve element 19.

As an example of how an adjustment might be made, rotary valve element 19 may be turned counterclockwise to a fully opened position. Then red end 182 of short drive shaft 128 may be rotated clockwise until red L.E.D. 42 on the side of switch housing 14 goes out. Next, red end 182 of short drive shaft 128 is rotated counter-clockwise until red L.E.D. 42 just goes on. At this point, indicator 10 is adjusted for 0° or the number of degrees of rotary element as designed and provided by the valve manufacturer for an open valve. If it is desired to have the open signal at 4½° prior to rotary element 19's being fully open, then red end 182 will be rotated counterclockwise another 4½ turns. Thus, when rotary element 19 turns counterclockwise during opening, at the point of rotation 4½ degrees before fully open, red L.E.D. 42 will go on and an "open" electrical signal will be generated that the valve is open. If desired, ample room may be provided within cap 172 to record this adjustment number as with adhesive note paper (not shown). Close magnet carrier 146 is adjusted in a similar manner as explained with respect to open magnet carrier 144 hereinbefore. In general terms, as green slotted end 184 is rotated, long drive shaft 124 rotates lower gear 136 to thereby rotate close magnet carder 146, magnet 104, and green outer surface 180.

After adjustments are completed, bolts 132 and 134 are tightened to thereby simultaneously lock open and close magnet carriers 144 and 146, respectively, in position. This tightening or locking also effectively seals out moisture from entering into magnet housing 100. Cap 172 is then secured in place with cap retainer bolt 174, ensuring that indicator arrow 176 will be pointed in the correct direction as per markings/labels (not shown) on actuator housing 12. Indicator arrow 176 is snapped back in place.

The foregoing disclosure and description of the invention is illustrative and explanatory thereof, and it will be appreciated by those skilled in the art that various changes in the size, shape, positioning, and materials, as well as in the details of the illustrated construction or combinations of features of the various elements, may be made without departing from the spirit of the invention.

I claim:

1. An apparatus for indicating the position of a rotary valve element, said rotary valve element being rotatable by an actuator, said actuator including an actuator housing and having a rotational element rotatable with said rotary valve element, said apparatus comprising:

an extension member rotatably secured to said rotational element for rotation therewith;

a first magnet support carried by said extension member for supporting a first magnet, said first magnet support being operative for selective positioning of said first magnet with respect to said extension member;

a securing means for selectively affixing said first magnet with respect to said extension member; and an electronic switch assembly comprising a switch housing mounted to said actuator housing independently from said extension member and said rotational element, said electronic switch assembly being mounted at a selected distance from said extension member, a first reed switch internal to said switch housing and responsive to rotation of said first magnet for indicating a first position of said rotary valve element.

2. The apparatus of claim 1, further comprising:

a second magnet support carried by said extension member for supporting a second magnet, said second magnet support being operative for selective positioning of said second magnet with respect to said extension member, and a second reed switch internal to said switch housing and responsive to rotation of said second magnet for indicating a second position of said rotary valve element.

3. The apparatus of claim 2, further comprising:

a first color-coded outer surface for said first magnet support, and a second color-coded outer surface for said second magnet support.

4. The apparatus of claim 3, further comprising:

a first drive member with a first color-coded end portion corresponding to said first color-coded outer surface, and a second drive member with a second color-coded end portion corresponding to said second color-coded outer surface.

5. The apparatus of claim 3, further comprising:

first and second light-emitting diodes operable for providing a visual signal, said first and second light-emitting diodes each being color-coded to correspond to respective of said first and second color-coded outer surfaces.

6. The apparatus of claim 2, wherein:

said switch housing comprises a substantially solid body of nonconducting material that encompasses said first and second reed switches.

7. The apparatus of claim 1, wherein all surfaces of said switch housing are substantially smooth.

8. The apparatus of claim 1, further comprising:

a first gear operable for rotating said first magnet support about said extension member, and first gear teeth along an arcuate surface of said first magnet support and being operable for engaging said first gear.

9. The apparatus of claim 8, wherein:

said arcuate surface with said first gear teeth is disposed along an interior portion of said first magnet support.

10. The apparatus of claim 8, further comprising:

a first gear shaft secured to said first gear, said first gear shaft being rotatable within an aperture in said extension member.

11. The apparatus of claim 8, further comprising:

a second magnet support for supporting a second magnet and having an aperture therethrough for receiving said extension member, said second magnet support being spaced axially with respect to said first magnet support along an axis of said extension member, said second magnet support being rotatable with respect to said extension member and said first magnet support, said second magnet support having second gear teeth along an arcuate surface thereof, and a second gear engageably connected to said second gear teeth and operable for rotating said second magnet support about said extension member.

12. The apparatus of claim 11, further comprising:

a second gear shaft disposed for rotation within said extension member, said first and second gear shafts being substantially parallel to said axis of said extension member, said first and second gear shafts being operable to rotate said first and second gears, respectively.

13. A valve position indicator for operation with an actuator, said actuator including an actuator housing and an actuator assembly for rotating a rotary valve element, said actuator assembly having a rotational element rotatable with said rotary valve element, said valve position indicator comprising:

an electronic control comprising a switch housing substantially filled with an electrically non-conductive material, first and second switches internal of said switch housing operable to provide first and second indications of respective first and second rotary valve positions;

an extension member rotatably secured with respect to said rotational element for rotation therewith, said extension member having an outer surface;

a first magnet support carded by said extension member, a first magnet carried by said first magnet support and operable for magnetically controlling said first switch, said first magnet support having an opening for receiving said outer surface of said extension member and being rotatable with respect thereto; and a second magnet support carried by said extension member, a second magnet carried by said second magnet support and operable for magnetically controlling said second switch, said second magnet support having an opening for receiving said outer surface of said extension member and being rotatable with respect to said extension member, said second magnet support being spaced axially from said first magnet support.

14. The valve position indicator of claim 13, further comprising:

a first color-coded outer surface of said first magnet support, and a second color-coded outer surface of said second magnet.

15. The valve position indicator of claim 14, further comprising:

first gear teeth disposed on a first arcuate inner surface of said first magnet carrier, second gear teeth disposed on a second arcuate inner surface of said second magnet carrier, and first and second gears operable for driving respective of said first and second gear teeth.

16. The valve position indicator of claim 15, further comprising:

a first gear shaft rotatably secured to said first gear, said first gear shaft having a first color-coded end portion corresponding to said first color-coded outer surface, and a second gear shaft rotatably secured to said second gear, said second gear shaft having a second color-coded end portion corresponding to said second color-coded outer surface.

17. The valve position indicator of claim 14, further comprising:

first and second light-emitting diodes each operable for providing a visual signal when a respective of said first and second reed switches is conducting electricity, said first and second light-emitting diodes each being color-coded to correspond to respective of said first and second color-coded outer surfaces.

18. A magnet carrier for a valve position indicator, said valve position indicator including first and second magnetically responsive switches for indicating first and second positions of a rotary valve element, said magnet carrier comprising:

an extension member secured with respect to said rotary valve element for rotation therewith and having an extension member axis, said extension member having an outer surface;

a first magnet support selectively rotatable with respect to said extension member, a first magnet carried by said first magnet support, said first magnet support having an opening for receiving said outer surface of said extension member, said first magnet support having a first color-coded outer surface and being operable for positioning said first magnet with respect to said first magnetically responsive switch; and a second magnet support carried by said extension member, a second magnet carded by said second magnet support, said second magnet support having an opening for receiving said outer surface of said extension member, said second magnet support being spaced axially from said first magnet support, said second magnet support having a second color-coded outer surface and being operable for positioning said second magnet with respect to said second switch.

19. The magnet carrier of claim 18, further comprising:

a first drive member operable for rotating said first magnet support with respect to said extension member and having a first color-coded end portion corresponding to said first color-coded outer surface, and a second drive member operable for rotating said second magnet carrier with respect to said extension member and having a second color-coded end portion corresponding to said second color-coded outer surface.

20. The magnet carrier of claim 18, wherein:

said extension member has two apertures therein for receiving said first and second drive members such that said apertures are oriented parallel to said extension member axis.

21. The magnet carrier of claim 18, further comprising:

a first lobe protruding from said first magnet support member, said first lobe containing said first magnet therein, and a second lobe protruding from said second magnet support member, said second lobe containing said second magnet therein.

22. The magnet carrier of claim 18, further comprising:

an end cap disposed on an end portion of said magnet housing, said end cap having a visual valve position indicator thereon rotatable with said rotary valve element.

23. The magnet carrier of claim 18, further comprising:

an end cap disposed on an end portion of said magnet housing, said end cap having a visual orientation indicator thereon rotatable with said rotary valve element.

24. A magnet carrier for a valve position indicator, said valve position indicator including first and second magnetically responsive switches for indicating first and second positions of a rotary valve element, said magnet carder comprising:

an extension member rotatably secured with respect to said rotary valve element for rotation therewith and having an extension member axis, said extension member having first and second apertures therein with each of said first and second apertures having a respective axis substantially parallel to said extension member axis;

a first magnet support carried by said extension member and a first magnet carried by said first magnet support;

a second magnet support carried by said extension member and a second magnet carried by said second magnet support;

a first drive member operable for moving said first magnet support with respect to said extension member, said first drive member being received within said first aperture; and a second drive member operable for moving said second magnet support with respect to said extension member, said second drive member being received within said second aperture.

25. The magnet carder of claim 24, further comprising:

a first color-coded outer surface of said first magnet support, and a second color-coded outer surface of said second magnet support.

26. The magnet carrier of claim 25, further comprising:

a first color-coded end of said first drive member corresponding to said first color-coded outer surface, and a second color-coded end of said second drive member corresponding to said second color-coded outer surface.

\* \* \* \* \*

UNITED STATES PATENT AND TRADEMARK OFFICE
CERTIFICATE OF CORRECTION

PATENT NO. : 5,518,028
DATED : May 21, 1996
INVENTOR(S) : Daniel Walker

It is certified that error appears in the above-indentified patent and that said Letters Patent is hereby corrected as shown below:

In column 14, line 18, delete "carded" and insert therefor --carried--.

In column 16, line 12, delete "carder" and insert therefor --carrier --.

Signed and Sealed this

Seventeenth Day of September, 1996

*Attest:*

BRUCE LEHMAN

*Attesting Officer*     *Commissioner of Patents and Trademarks*